(12) United States Patent
Yasushita

(10) Patent No.: US 9,766,378 B2
(45) Date of Patent: Sep. 19, 2017

(54) OPTICAL FILM, POLARIZING PLATE EQUIPPED WITH THE OPTICAL FILM, LIQUID CRYSTAL DISPLAY DEVICE, AND METHOD FOR PRODUCING AN OPTICAL FILM

(71) Applicant: FUJIFILM Corporation, Tokyo (JP)

(72) Inventor: Chihiro Yasushita, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 41 days.

(21) Appl. No.: 14/864,236

(22) Filed: Sep. 24, 2015

(65) Prior Publication Data

US 2016/0091637 A1  Mar. 31, 2016

(30) Foreign Application Priority Data

Sep. 26, 2014  (JP) .................................. 2014-196269
Jul. 31, 2015  (JP) .................................. 2015-152802

(51) Int. Cl.
*C09K 19/00* (2006.01)
*G02B 1/14* (2015.01)
(Continued)

(52) U.S. Cl.
CPC .................. *G02B 1/14* (2015.01); *B32B 7/12* (2013.01); *B32B 23/08* (2013.01); *B32B 23/20* (2013.01);
(Continued)

(58) Field of Classification Search
CPC .......... G02B 1/14; G02B 5/30; G02B 5/3033; G02F 1/133528; C09D 163/00;
(Continued)

(56) References Cited

U.S. PATENT DOCUMENTS

2006/0178454 A1\*  8/2006  Saito ................... C08K 5/5399
523/443
2009/0136732 A1  5/2009  Uchida et al.
(Continued)

FOREIGN PATENT DOCUMENTS

JP  H04-139210 A  5/1992
JP  2000-080153 A  3/2000
(Continued)

OTHER PUBLICATIONS

Office Action, issued by the Japanese Patent Office (JPO) dated Jun. 20, 2017 in connection with Japanese Patent Application No. 2015-152802.

*Primary Examiner* — Ruiyun Zhang
(74) *Attorney, Agent, or Firm* — Edwards Neils LLC; Jean C. Edwards, Esq.

(57) ABSTRACT

An optical film (polarizing plate protecting film) is equipped with a substrate and a hard coat layer provided on the substrate. The hard coat layer is a layer obtained by curing a photocurable composition on the substrate. The photocurable composition includes an epoxide represented by Chemical Formula I below, a bisphenol compound, and a cationic photopolymerization initiator.

[Chemical Formula I]

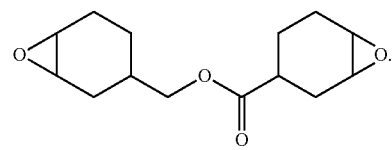

Compound 1a

12 Claims, 1 Drawing Sheet

(51) Int. Cl.
*G02B 5/30* (2006.01)
*B32B 23/08* (2006.01)
*B32B 23/20* (2006.01)
*B32B 27/38* (2006.01)
*C09D 163/00* (2006.01)
*B32B 7/12* (2006.01)
*G02F 1/1335* (2006.01)

(52) U.S. Cl.
CPC ............ *B32B 27/38* (2013.01); *C09D 163/00* (2013.01); *G02B 5/3033* (2013.01); *B32B 2307/412* (2013.01); *B32B 2307/42* (2013.01); *B32B 2307/536* (2013.01); *B32B 2457/202* (2013.01); *B32B 2551/00* (2013.01); *G02F 1/133528* (2013.01); *Y10T 428/10* (2015.01); *Y10T 428/1036* (2015.01)

(58) Field of Classification Search
CPC ......... B32B 23/04; B32B 23/08; B32B 23/23; B32B 27/38; B32B 2307/42; B32B 2307/536; B32B 2457/202; Y10T 428/10; Y10T 428/1036; Y10T 428/105; C08L 63/00
USPC .................. 428/1.1, 1.3, 1.33, 413; 349/96; 427/553, 558; 522/36; 359/483.01
See application file for complete search history.

(56) References Cited

U.S. PATENT DOCUMENTS

2013/0120839 A1* 5/2013 Fukagawa ............ G02B 5/3025
359/483.01
2013/0189449 A1 7/2013 Fukagawa et al.

FOREIGN PATENT DOCUMENTS

| JP | 2000-347001 A | 12/2000 |
| JP | 2004-126206 | 4/2004 |
| JP | 2004-269641 A | 9/2004 |
| JP | 2007-297604 A | 11/2007 |
| JP | 2010-253767 | 11/2010 |
| JP | 2011-203696 | 10/2011 |
| JP | 2013-174861 A | 9/2013 |

* cited by examiner

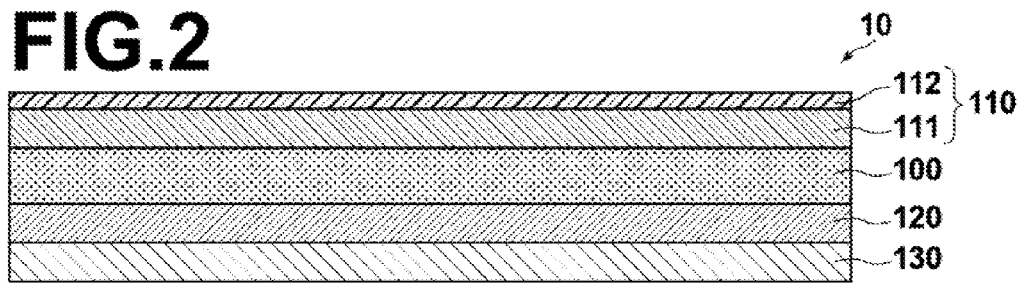
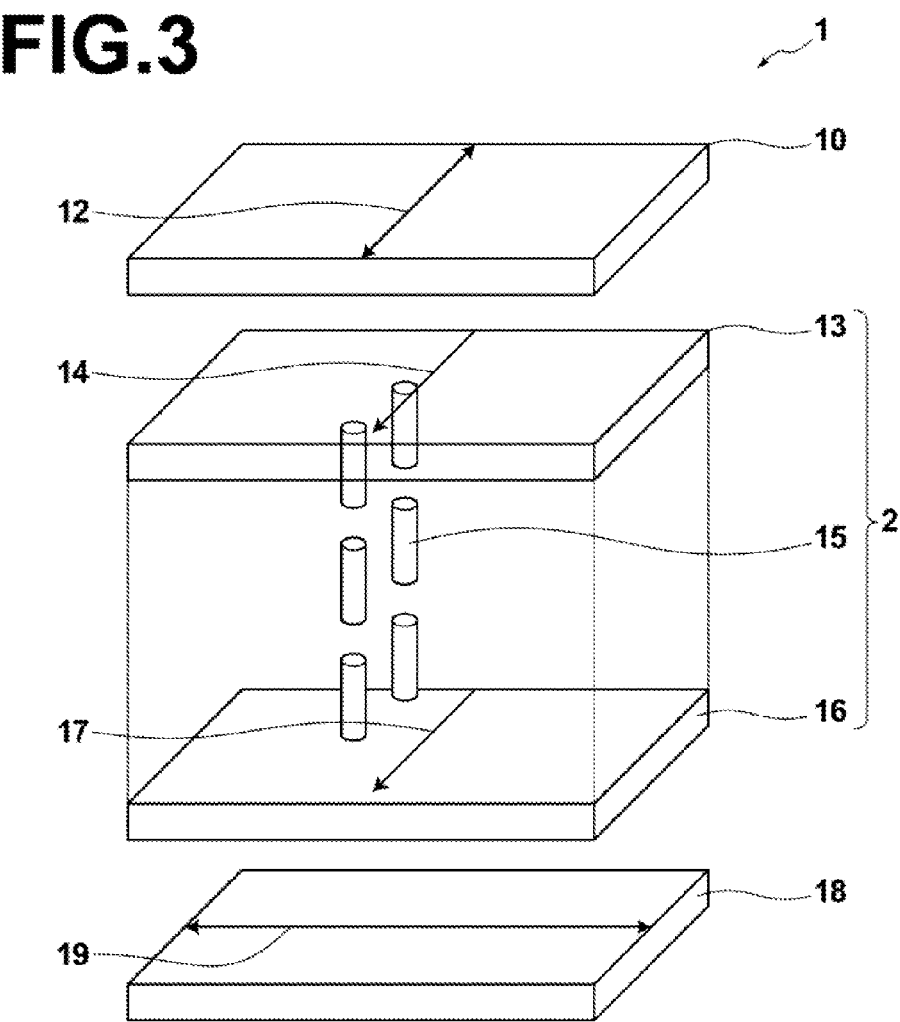

OPTICAL FILM, POLARIZING PLATE EQUIPPED WITH THE OPTICAL FILM, LIQUID CRYSTAL DISPLAY DEVICE, AND METHOD FOR PRODUCING AN OPTICAL FILM

CROSS REFERENCE TO RELATED APPLICATIONS

The present application claims priority under 35 U.S.C. §119 to Japanese Patent Application No. 2014-196269, filed on Sep. 26, 2014, and Japanese Patent Application No. 2015-152802, filed on Jul. 31, 2015. Each of the above applications is hereby expressly incorporated by reference, in its entirety, into the present application.

BACKGROUND

The present disclosure is related to an optical film which is favorably suited for use as a polarizing plate protecting film, a polarizing plate, a liquid crystal display device, and a method for producing an optical film.

In recent years, liquid crystal display devices are widely employed in liquid display panels for televisions, personal computers, cellular phones and digital cameras. Generally, a liquid crystal display device includes a liquid crystal panel member having a polarizing plate on both sides of liquid crystal cells, and display is performed by controlling light emitted from a backlight member with the liquid crystal panel member. The polarizing plate is configured with a polarizer and at least one polarizing plate protecting film.

The quality of recent liquid crystal displays is improving, and applications thereof are also becoming diversified. Use of liquid crystal displays in various environments is being considered, and therefore there is demand for durability compatible with such environments as well as performance stability. In liquid crystal display devices which are to be employed outdoors, there is demand for durability such as hardness and brittleness sufficient to withstand use outdoors, stable dimensional properties with respect to temperature and humidity changes, and stability of optical properties in polarizing plate protecting films for protecting the surfaces of polarizing plates. In particular, in a high humidity environment, degradation of polarizers due to moisture absorption is a problem, and achieving low moisture permeability in polarizing plate protecting films is an important objective.

Japanese Unexamined Patent Publication No. 2007-297604 discloses an optical film having superior durability in high temperature and high humidity environments, which is produced by curing a thermosetting resin composition containing a polylactic acid resin and an epoxy resin and/or oxetane resin as essential components. In the Examples of Japanese Unexamined Patent Publication No. 2007-297604, the pencil hardness of 80 μm thick films formed on the PET films (polyethylene terephthalate films) is as high as H, and as low as 6B. With respect to the water absorption rates of these Examples, it is described that the lowest water absorption rate is 2.8%.

Japanese Unexamined Patent Publication No. 2013-174861 discloses a polarizing plate having at least one polarizing plate protecting film formed by at least one resin and a polarizer durability improving agent, which is a compound having at least one hydrogen bonding hydrogen-donating group and in which the ratio of the molecular weight/number of aromatic rings is 300 or less.

Japanese Unexamined Patent Publication No. 2013-174861 discloses that according to the polarizing plate of Japanese Unexamined Patent Publication No. 2013-174861, polarizer durability is superior even in an environment of high temperature and high humidity, the curl is small, that warping or distortion of a liquid crystal panel due to environments, and display unevenness caused thereby are unlikely to occur.

SUMMARY

However, in the polarizing plate of Japanese Unexamined Patent Publication No. 2007-297604, the evaluations of hardness and water absorption of the polarizing plate protecting film are those for a relatively thick film having a thickness of 80 μm. In recent years, weight reduction and reduction of thickness are progressing in liquid crystal displays. If a thickness that is required for the polarizing plate protecting film is considered, it is difficult to say that the polarizing plate protecting film of Japanese Unexamined Patent Publication No. 2007-297604 has a sufficient hardness and moisture permeability (refer to the Comparative Example to be described later).

Further, in Japanese Unexamined Patent Publication No. 2013-174861, the durability evaluation is performed only for changes in the dimensions and optical characteristics with respect to temperature and humidity changes, and the hardness of the polarizing plate protecting film is not evaluated. The required hardness level of films is increasing as liquid crystal display devices are becoming thinner, and it is unlikely for hardness to be sacrificed for environmental resistance in a protective film.

The present disclosure has been developed in view of the above circumstances. The present disclosure provides an optical film having high degree of hardness and low moisture permeability which is favorably suited for use as a polarizing plate protecting film.

The present disclosure also provides a polarizing plate that exhibits less deterioration due to moisture absorption, as well as a liquid crystal display device.

Means for Solving the Problems

The optical film of the present disclosure is an optical film comprising:

a substrate; and a hard coat layer on the substrate;

the hard coat layer being a layer obtained by curing a photocurable composition on the substrate;

the photocurable composition including an epoxide represented by Chemical Formula I below, a bisphenol compound, and a cationic photopolymerization initiator. A method for producing an optical film of the present disclosure is a method for producing an optical film comprising a substrate and a hard coat layer on the substrate, and comprises coating a photocurable composition including an epoxide represented by Chemical Formula I below, a bisphenol compound, and a cationic photopolymerization initiator on the substrate to form a coated film, and forming a hard coat layer by irradiating light onto the coated film to cure the coated film.

[Chemical Formula I]

Compound 1a

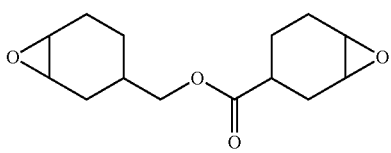

In the optical film and the method of producing an optical film and an optical film of the present disclosure, the bisphenol compound is preferably those represented by General Formula II-1 below, and more preferably those represented by General Formula II-2 below.

[General Formula II-1]

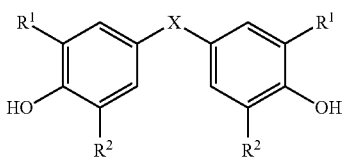

In the above formula, $R^1$ and $R^2$ represent a hydrogen atom, a halogen atom or a hydrocarbon group having a carbon number within a range from 1 to 15. X represents a divalent linking group formed by at least one species selected from among a single bond, a hydrocarbon group having a carbon number within a range from 1 to 15, an oxygen atom, a sulfur atom, and a sulfonyl group.

[General Formula II-2]

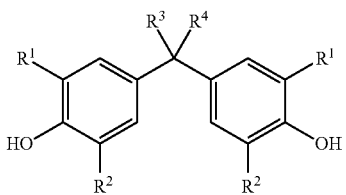

In the above formula, $R^1$, $R^2$, $R^3$ and $R^4$ represent hydrogen or a hydrocarbon group having a carbon number within a range from 1 to 15. $R^3$ and $R^4$ may bind to form a single cyclic structure.

In Chemical Formula I, General Formula II-1, and General Formula II-2, the hydrocarbon group having a carbon number within a range from 1 to 15 may be any one of a linear group, a branched group, and a cyclic group.

In General Formulae II-1 and II-2, it is preferable for $R^1$ and $R^2$ to be hydrogen or a hydrocarbon group having a carbon number within a range from 1 to 6. It is more preferable for $R^1$ to be hydrogen, and for $R^2$ to be a methyl group.

In the optical film and the method of producing an optical film of the present disclosure, it is preferable for the content of the bisphenol compound with respect to the total solid content of the photocurable composition to be within a range from 1% to 40%.

In addition, it is preferable for the substrate to be a cellulose ester substrate.

It is preferable for the light which is irradiated onto the coated film formed by coating the photocurable composition to be ultraviolet light. It is preferable for the light to be irradiated in a state in which the substrate on which the coated film is formed is heated. It is preferable for heating to be ceased after irradiating the light.

The optical film of the present disclosure is favorably suited for us as a polarizing plate protecting film.

The polarizing plate of the present disclosure comprises, a polarizer, and the optical film of the present disclosure formed on at least one surface of the polarizer.

The liquid crystal display device of the present disclosure is a liquid crystal display device comprising a pair of polarizing plates and liquid crystal cells clamped between the polarizing plates, in which at least one of the pair of polarizing plates is the polarizing plate of the present disclosure.

In the present specification, the expression "moisture permeability is low (low moisture permeability)" with respect to optical films means that the moisture permeability of an optical film is 200 $g/m^2$/day or less in an environment at 40° C. and a relative humidity of 90% for 24 hours as measured by the method of JIS Z 0208.

The expression "hardness is high (high degree of hardness)" with respect to optical films means that the pencil hardness of an optical film is F or greater according to JISK5600-5-4.

The optical film of the present disclosure is an optical film comprising: a substrate; and a hard coat layer on the substrate, which is produced by coating a photocurable composition including an epoxide represented by Chemical Formula I above, a bisphenol compound, and a cationic photopolymerization initiator on the substrate to form a coated film, and forming a hard coat layer by irradiating light onto the coated film to cure the coated film, thereby forming the hard coat layer. The hard coat layer formed by curing the photocurable composition has a high degree of hardness and a low moisture permeability. Accordingly, the present disclosure can provide an optical film having high degree of hardness and low moisture permeability which is favorably suited for use as a polarizing plate protecting film.

The polarizing plate of the present disclosure comprises the optical film of the present disclosure as a polarizing plate protecting film. Accordingly, the present disclosure can provide a polarizing plate in which deterioration due to moisture absorption is low, as well as a liquid crystal display device.

BRIEF DESCRIPTION OF THE DRAWINGS

FIG. 1 is a schematic sectional view showing the structure of an optical film according to an embodiment of the present disclosure.

FIG. 2 is a sectional schematic view showing the configuration of a polarizing plate according to an embodiment of the present disclosure.

FIG. 3 is a schematic perspective view showing the configuration of a liquid crystal display device according to an embodiment of the present disclosure.

DETAILED DESCRIPTION OF THE PREFERRED EMBODIMENTS

"Optical Film (Polarizing Plate Protecting Film)"

An optical film (polarizing plate protecting film) according to an embodiment of the present disclosure will be described with reference to the attached drawings. FIG. 1 is a schematic diagram showing the structure of an optical film 110 according to an embodiment of the present disclosure.

The scales and dimensions of portions of the drawings of the present specification are changed as appropriate in order to facilitate visual recognition. In addition, expressions that read "(numerical value 1) to (numerical value 2)" in the present specification in cases that values of physical properties and values of characteristics are represented, these expressions mean "greater than or equal to (numerical value 1) and less than or equal to (numerical value 2)".

As illustrated in FIG. 1, the optical film 110 comprises a hard coat layer 112 formed on a substrate 111. The hard coat layer 112 is a layer obtained by curing a photocurable composition on the substrate 111. The photocurable composition comprises an epoxide (Compound 1a) represented by Chemical Formula I below, a bisphenol compound, and a cationic photopolymerization initiator.

[Chemical Formula I]

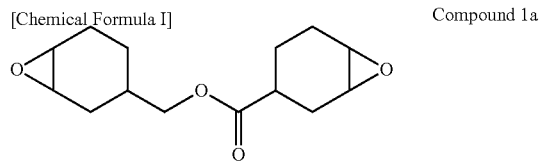

Compound 1a

The hard coat layer 112 obtained by curing such a photocurable composition has a high degree of hardness and a low moisture permeability, and is therefore favorably suited for use as a film member in which high degree of hardness and low moisture permeability are required. Each component of the optical film 110 will be described.

<Substrate>

Although not particularly limited, examples of the material of the substrate 111 is not particularly limited, include a cellulose ester film, a polycarbonate film, a polyester film such as polyethylene terephthalate and polyethylene naphthalate, a (meth) acrylic film such as polymethyl methacrylate, a styrene copolymer film such as polystyrene and an acrylonitrile-styrene copolymer, a cyclic polyolefin film, and the like. It is preferable for the substrate 111 to be a cellulose ester film due to easy penetration of Compound 1a, which is the epoxide (monomer), and high adhesive properties with respect to the substrate as well as with respect to a polarizating plate resin film.

Known films, plates, and sheets made of cellulose ester may be used as the cellulose ester substrate, and the substrate is not particularly limited. A cellulose acylate film (for example, cellulose triacetate film (refractive index: 1.48), a cellulose diacetate film, a cellulose acetate butyrate film, or a cellulose acetate propionate film) or the like may be utilized as the cellulose ester film.

Among the above, cellulose acylate film, which is commonly used as a polarizing plate protecting film due to its high transparency, low optical birefringence, and ease of production, is preferable. A cellulose triacetate film is more preferable. With respect to the transparency of the substrate 111, it is preferable for the transmittance of visible light therethrough to be 80% or greater.

It is preferable for a cellulose acetate having a degree of acetylation of 59.0 to 61.5% to be utilized as the cellulose acetate film.

The degree of acetylation refers to the amount of acetic acid bonded per unit mass of cellulose. The degree of acetylation is that according to measurement and calculation of the degree of acetylization by ASTM: D-817-91 (Test Method of Cellulose Acetate, etc.). It is preferable for the viscosity average polymerization degree (DP) of the cellulose acylate to be 250 or greater, and more preferably 290 or greater.

In addition, in the cellulose acylate film substrate, it is preferable for the value of Mw/Mn (Mw is weight average molecular weight, Mn is number average molecular weight) measured by gel permeation chromatography to be close to 1.0. In other words, it is preferable for the molecular weight distribution to be narrow. Specifically, it is preferable for the value of Mw/Mn to be 1.0 to 1.7, more preferably 1.3 to 1.65, and most preferably 1.4 to 1.6.

In general, the 2, 3, 6 hydroxyl groups of cellulose acylate are not necessarily uniformly distributed in ⅓ of the total degree of substitution, and there is a tendency for the degree of substitution of 6-position hydroxyl groups to be low. In the present disclosure, it is preferable for the degree of substitution of 6-position hydroxyl groups of the cellulose acylate to be greater than those in the 2 and 3 positions. It is preferable for the 6-position hydroxyl group to be substituted by 32% or more acyl groups with respect to the total degree of substitution, more preferably 33% or greater, and even more preferably 34% or greater. Furthermore the degree of substitution of 6-position acyl groups of cellulose acylate is preferably 0.88 or greater. 6-position hydroxyl groups may be substituted by propionyl groups, which are acyl groups having a carbon number of 3 or greater, butyroyl groups, valeroyl groups, benzoyl groups, acryloyl groups, and the like instead of acetyl groups. Measurements of the degree of substitution at each position can be obtained by NMR.

Examples of a cellulose acylate which is favorably suitable as the material of the substrate 111 are the cellulose acetates obtained by the methods described in paragraphs [0043] and [0044] as [Examples] [Synthesis Example 1], in paragraphs [0049] and [0049] as [Synthesis Example 2], and in paragraphs [0051] and [0052] as [Synthesis Example 3] in Japanese Unexamined Patent Publication No. 11(1999)-005851.

The thickness of the substrate 111 is generally within an approximate range from 20 μm to 1000 μm. In the case that the substrate 111 is a cellulose ester substrate, it is preferable for the film thickness is 20 μm or greater and 70 Ξm or less.

<Hard Coat Layer>

As described above, the hard coat layer 112 is formed by curing the coated film of the photocurable composition coated on the substrate 111. First, the photocurable composition of the present embodiment will be described.

<Photocurable Composition>

The photocurable composition which is coated onto the substrate 111 is that which includes an epoxide (Compound 1a) represented by Chemical Formula I below, a bisphenol compound, and a cationic photopolymerization initiator.

[Chemical Formula I]

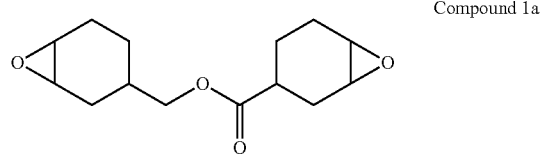

Compound 1a (Epoxide (Compound 1a))

The above epoxide (Compound 1a) is a difunctional epoxide. By being difunctional, the hard coat layer can be a cross linked layer having a three dimensional network structure. The hardness of a cross linked polymer film is higher than that of a film which is not cross linked.

If the content of the Compound 1a with respect to the total solid content of the photocurable composition is 50 mass % or greater, it is preferable in the point that both low moisture permeability and high degree of hardness can be achieved, and 60 mass % is more preferable.

In addition, from the viewpoint of securing curability, it is preferable for the content of Compound 1a with respect to the total solid content of the photocurable composition to be 99.5 mass % or less, and more preferably 99 mass % or less.

The present inventors have found that if the molecular weight of the polyfunctional epoxy monomer is 270 or less, preferably 140 or greater and 260 or less, it is possible to reduce the molecular weight between cross linking points in a polymer, and that it is possible to lower the moisture permeability. In addition, the present inventors have found that by the polyfunctional epoxy monomer, having a cycloalkane as a cyclic skeleton in addition to the epoxy ring, a decrease in hardness due to excessive plasticization when adding an agent that imparts low moisture permeability and the like can be suppressed. Compound 1a is a favorable epoxy monomer in the points of low moisture permeability and hardness that the present inventors have found by performing molecular design from these viewpoints.

Compound 1a is an epoxy monomer which can give a polymer superior low moisture permeability and hardness. By performing polymerization in a mixture including a bisphenol compound as an additive, it is possible to further lower the moisture permeability of the polymer of Compound 1a.

(Bisphenol Compound)

The present inventors performed focused study regarding an additive agent that can further lower the moisture permeability without decreasing hardness of the polymer to a great degree in the case that the epoxy monomer of Compound 1a is used.

As a result, the present inventors have found that a bisphenol compound may be such a permeability lowering agent, and the present disclosure was achieved. Bisphenol compounds are known for their use as antioxidants. Bisphenol compounds are also very effective in imparting a great deal of low moisture permeability. Further, it was found that bisphenol compounds do not significantly influence the hardness of a resin even if a high concentration thereof is added.

The Examples 2 through 5 below maintained H as the pencil hardnesses thereof even when the amount of added bisphenol compounds was increased two fold, four fold, and six fold. Meanwhile, with respect to moisture permeability, it is shown that the increase in the amount of added bisphenol compounds significantly improved low permeability properties.

Japanese Unexamined Patent Publication No. 2013-174861 discloses a compound having a phenol structure as a polarizer durability improving agent having at least one hydrogen bonding hydrogen donor molecule having a ratio of molecular/number of aromatic rings of 300 or less represented by General Formula (1). However, Japanese Unexamined Patent Publication No. 2013-174861 does not disclose specific examples of bisphenol compounds, and neither discloses nor suggests the aforementioned characteristics of bisphenol compounds.

Preferable bisphenol compounds of the present embodiment will be described below.

Although the bisphenol compounds are not particularly limited, bisphenol compounds represented by General Formula II-1 below are preferable, and bisphenol compounds represented by General Formula II-2 below are more preferable.

[General Formula II-1]

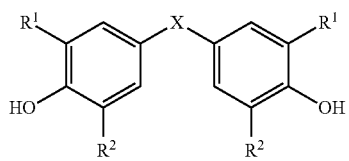

In the above formula, $R^1$ and $R^2$ represent a hydrogen atom, a halogen atom or a hydrocarbon group having a carbon number within a range from 1 to 15. X represents a divalent linking group formed by at least one species selected from among a single bond, a hydrocarbon group having a carbon number within a range from 1 to 15, an oxygen atom, a sulfur atom, and a sulfonyl group.

[General Formula II-2]

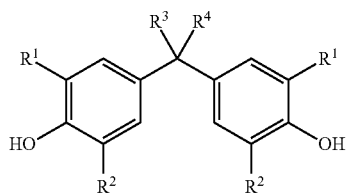

In the above formula, $R^1$, $R^2$, $R^3$ and $R^4$ represent hydrogen or a hydrocarbon group having a carbon number within a range from 1 to 15. $R^3$ and $R^4$ may bind to form a single cyclic structure.

In General Formulae II-1 and II-2, $R^1$ and $R^2$ are preferably hydrogen or a hydrocarbon group having a carbon number within a range from 1 to 6, from the viewpoints of compatibility and moisture permeability. It is more preferable for $R^1$ to be hydrogen, and for $R^2$ to be a methyl group.

It is preferable for the content of the bisphenol compound to the total solid content of the photocurable composition to be 1% to 40%.

Preferred examples of bisphenol compounds are shown below. However, the present disclosure is not limited to these specific examples.

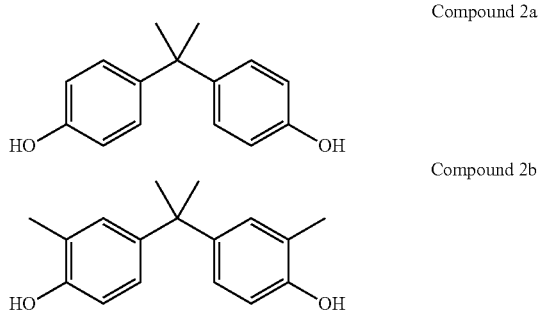

Compound 2a

Compound 2b

Compound 2c
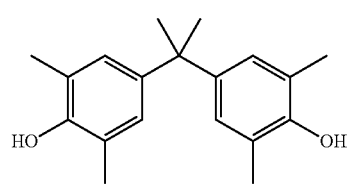
Compound 2d
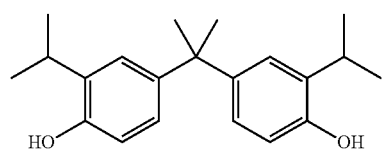
Compound 2e
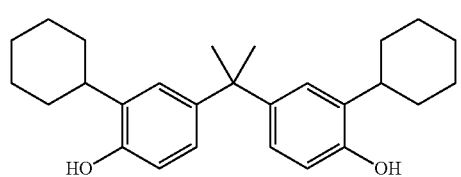
Compound 3a
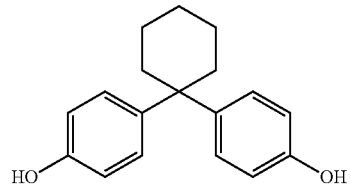
Compound 3b
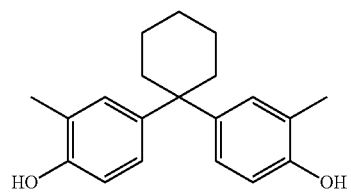
Compound 4
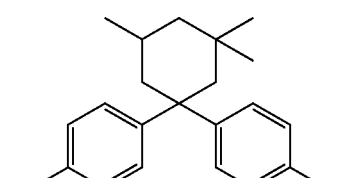
Compound 5
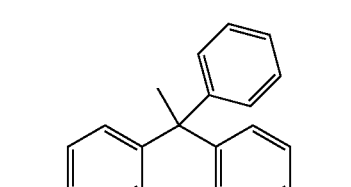
Compound 6
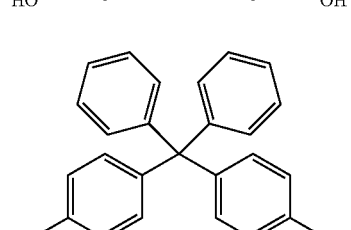
Compound 7a
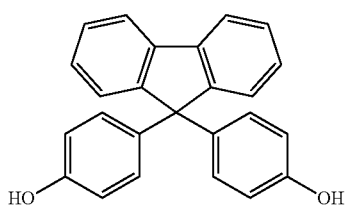
Compound 7b
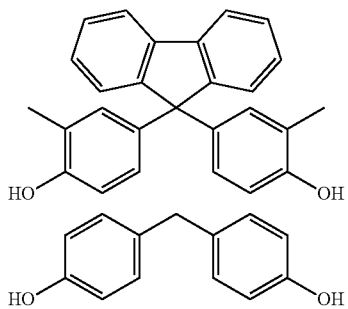
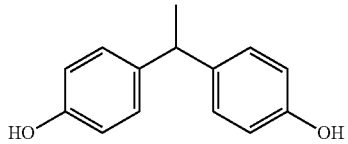
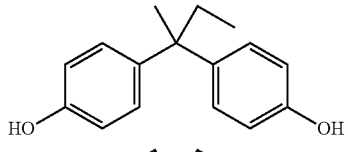
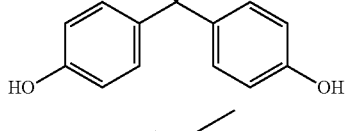
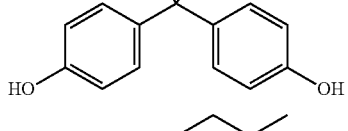
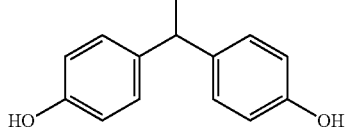
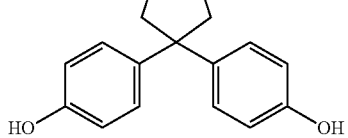
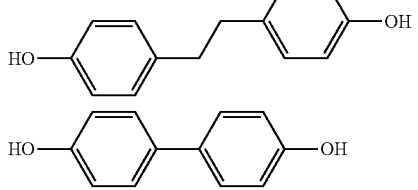

-continued

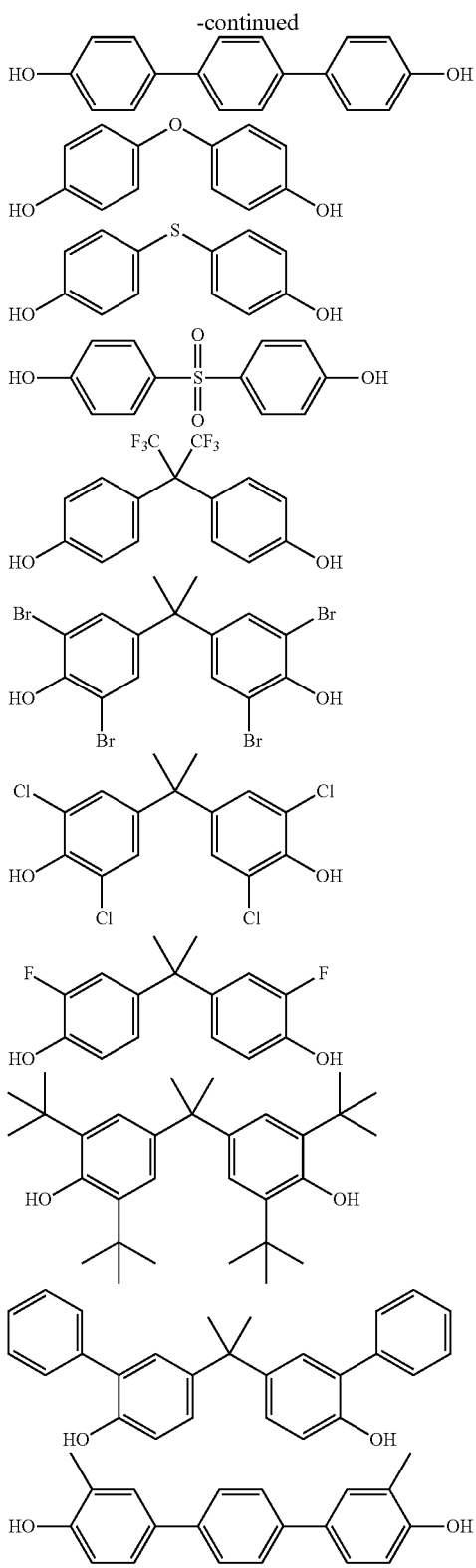

(Cationic Photopolymerization Initiator)

The epoxy ring of the Compound 1a, causes a polymerization reaction to occur when activation energy is irradiated in the presence of a cationic photopolymerization initiator. Sulfonium salt, iodonium salt, diazonium salt, etc. may be employed as the cationic photopolymerization initiator. Specifically, "Irgacure 290 (product name, BASF Ltd.)", "Irgacure 250 (product name, BASF Ltd.)", "Irgacure 270 (product name, BASF Ltd.)", "CPI-100P (product name, San-Apro Ltd.)", "CPI-101A (product name, San-Apro Ltd.)", "CPI-200K (product name, San-Apro Ltd.)", "CPI-210S (product name, San-Apro Ltd.)", "WPI-170 (product name, Wako Pure Chemical Industries, Ltd.)", the diaryl iodonium salts according to claim 1 of Japanese Patent No. 4,841,935, and the like may be employed as the cationic photopolymerization initiator.

From the viewpoints of polymerizing epoxy rings and to perform settings such that start points do not excessively increase, it is preferable for content of the cationic photopolymerization initiator with respect to the total solid content of the photocurable composition to be from 0.5 mass % to 8 mass %, and more preferably from 1 mass % to 5 mass %.

(Solvent)

The photocurable composition may contain a solvent. Various solvents may be employed, taking the solubility of the monomer, the drying property during coating, the dispersibility of light-transmitting particles, etc. into consideration. Examples of such an organic solvent include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate carbonate methylethyl carbonate, diethyl acetone, methyl ethyl ketone (MEK), diethyl ketone, dipropyl ketone, diisobutyl ketone, cyclopentanone, cyclohexanone, methyl cyclohexanone, ethyl formate, propyl formate pentyl, methyl acetate, ethyl acetate, acetic acid propyl, methyl propionate, ethyl propionate, γ-butyrolactone, 2-methoxy methyl acetate, 2-ethoxyethyl acetate, 2-ethoxyethyl acetate, 2-ethyl ethoxypropionate, 2-methoxyethanol, 2-propoxy ethanol, 2-butoxyethanol, 1,2-diacetoxy acetone, acetylacetone, diacetone alcohol, methyl acetoacetate, ethyl acetoacetate such as methyl alcohol, ethyl alcohol, isopropyl alcohol, n-butyl alcohol, cyclohexyl alcohol, isobutyl acetate, methyl isobutyl ketone (MiBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, and toluene, xylene. These solvents may be employed alone or in combinations of two or more solvents.

Among the above solvents, employing at least one of methyl acetate, ethyl acetate, methyl ethyl ketone, acetyl acetone, acetone, cyclohexanone, and toluene is preferable.

Among these solvents, employing at least one of methyl acetate, acetone, methyl ethyl ketone, and cyclohexanone is preferable, particularly from the viewpoint of having permeability with respect to the substrate 111, which is a cellulose ester substrate.

Note that it is preferable for the solvent to be employed such that the concentration thereof with respect to the solid content of the photocurable composition is within a range from 5 mass % to 90 mass %.

A solvent, an inorganic filler, an ultraviolet absorber, a surfactant, and light-transmissive resin particles may be added to the photocurable composition as necessary. Each of these components will be described below.

[Inorganic Filler]

An inorganic filler may be added to the photocurable composition by adjusting the type and the amount added, according to the required refractive index, film strength, film thickness, coating properties, etc.

The shape of the inorganic filler is not particularly limited. Any of a spherical, a plate shaped, a fibrous, a rod shaped, and an irregularly shaped inorganic filler may be favorably employed, for example.

In addition, it the type of the inorganic filler is not particularly limited. However, non crystalline inorganic fillers are preferable. It is preferable for the inorganic filler to be metal oxides, nitrides, sulfides or halides. Metal oxides are particularly preferable, and silica is most preferable. Examples of a metal atom include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, Ni, etc. To increase the affinity between the inorganic filler and the organic component, it is also possible to treat the surface of the inorganic filler with a surface modifying agent comprising an organic segment.

In order to obtain a transparent cured film it is preferable for the average particle diameter of the inorganic filler to be of a value within a range from 0.001 μm to 0.2 μm, more preferably a range from 0.001 μm to 0.1 μm, and even more preferably a range from 0.001 μm to 0.06 μm. The average particle diameter of the particles is measured by a Coulter counter.

In addition, the inorganic filler may be used in a dry state, or in a state dispersed in water or an organic solvent.

[Ultraviolet Absorber]

The polarizing plate protecting film of the present disclosure can be used for a polarizing plate or an image display device member. From the viewpoint of preventing deterioration of a polarizing plate or liquid crystal cells, ultraviolet absorbing properties can be imparted to the polarizing plate protecting film by including an ultraviolet absorber in the photocurable composition for forming the hard coat layer.

Known ultraviolet absorbers may be employed. Examples of such known ultraviolet absorbers are those disclosed in Japanese Unexamined Patent Publication No. 2001-072782 and PCT Japanese Publication No. 2002-543265.

From the viewpoints of superior absorption performance for ultraviolet rays having wavelengths of 370 nm or less and favorable liquid crystal display properties, ultraviolet absorbers that absorb small amounts of visible light having wavelengths of 400 nm or longer are preferably employed. A single ultraviolet absorber may be employed, or combinations of two or more ultraviolet absorbers may be employed. Examples of such ultraviolet absorbers are those disclosed in Japanese Unexamined Patent Publication No. 2001-072782 and PCT Japanese Publication No. 2002-543265. Specific examples of the ultraviolet absorber include oxy benzophenone compounds, benzotriazole compounds, salicylate ester compounds, benzophenone compounds, cyanoacrylate compounds, nickel complex salt-based compounds, and triazine compounds.

[Light Transmissive Resin Particles]

The photocurable resin composition for forming the hard coat layer of the present embodiment may also include light transmissive resin particles (also referred to as light diffusing particles). Incorporating the light transmitting particles in the photocurable resin composition for forming the hard coat layer will enable an uneven shape to be imparted on the surface of the hard coat layer 112 or for internal haze to be imparted.

The average particle size of the light transmissive resin particles is 1.0 μm or greater and 8.0 μm or less, preferably 1.2 μm or greater and 6.0 μm or less, and more preferably 1.4 μm or greater and 3.0 μm or less. In the present specification, the average particle diameter indicates a primary particle size. If the average particle diameter is 1.0 μm or greater, it will be possible to increase the surface roughness of the hard coat layer 112 in an appropriate manner by controlling the agglomeration of particles and an antiglare property is exhibited. In addition, if the average particle diameter is 3.0 μm or less, it will not be necessary to form the hard coat layer 112 to be excessively thick in order to for a desired surface shape, and deterioration of curling properties and brittleness can be suppressed.

It is also preferable to utilize two or more types of particles having average particle diameters different from each other as a means for adjusting the surface shape of unevenness to be within a specific range.

An arbitrary measurement method may be applied as the method for measuring the particle diameters of the light transmissive resin particles, as long as the measurement method is that which measures the particle diameter of the particles. Such measurement methods include a method in which the particle size distribution of the particles is measured by the Coulter counter method, the measured distribution is converted to a particle number distribution, and the particle diameters are calculated from a particle distribution obtained by the conversion, and a method in which particles are observed by a transmissive electron microscope (magnification of 500,000× to 2,000,000×), 100 particles are observed, and the average value of the 100 observed particles is designated as the average particle diameter.

The average particle diameter in the present specification is a value obtained by the Coulter counter method.

To form a surface shape of unevenness in the hard coat layer 112, it is preferable for the ratio of the thickness of the hard coat layer to the average particle size of the light transmissive resin particles (film thickness of the hard coat layer/average particle size of the light transmissive resin particles) to be from 1.0 to 2.0, more preferably from 1.1 to 1.9, and even more preferably from 1.2 to 1.8. If this ratio is 1.0 or greater, the unevenness of the film surface does not become excessively large, and the polarizing plate will be superior from the viewpoints of black interference and point defects. Meanwhile, if the ratio is 2.0 or less, it is not necessary to add a large amount of particles in order to achieve the desired anti glare properties, and is superior from the viewpoint of the hardness of the film.

When providing the uneven shape on the surface of the hard coat layer 112, it is preferable to design the arithmetic mean roughness Ra of the surface irregularity to be 0.01 μm to 0.25 μm, more preferably 0.01 μm to 0.20 μm, and even more preferably 0.01 μm to 0.15 μm. If the value of Ra is 0.01 μm or greater, distinct anti-glare properties can be obtained. Meanwhile, if the value of Ra is 0.25 μm or less, black contrast is exhibited.

It is preferable for the haze value of the hard coat layer 112 to be designed to be from 0.3% to 5.0%, more preferably from 0.5% to 3.0%, and even more preferably from 0.5% to 2.0%. By designing the haze to be in this range, it is possible to achieve both superior antiglare properties and black contrast properties.

The refractive index of the light transmissive resin particles is measured by dispersing an equal volume of the light transmissive particles in solvents of which the refractive indices differ due to different mixing ratios of two types of solvents having different refractive indices, selected from among methylene iodide, 1,2-dibromopropane, and n-hexane, measuring the turbidity, and by measuring the refractive index of the solvents with an Abbe refractometer when the turbidity becomes minimal.

The light transmissive resin particles, can impart internal scattering properties by controlling the difference in refractive index with a binder. However, contrast will decrease if internal scattering properties are great. Therefore, it is preferable to design a difference in refractive index with an antiglare layer excluding the light transmissive resin particles to be 0.010 or less. The difference in refractive index between the light transmissive resin particles and the binder is 0.01 or less, preferably 0.005 or less, and more preferably 0. By setting the refractive index difference can be in this range, it is possible to eliminate the decrease in contrast caused by internal scattering.

Specific examples of the light transmissive resin particles include resin particles such as cross linked polymethyl methacrylate particles, cross linked methyl methacrylate-styrene copolymer particles, cross linked polystyrene particles, cross linked methyl methacrylate-methyl acrylate copolymer particles, cross linked methyl methacrylate-styrene copolymer polymerized particles, melamine-formaldehyde resin particles, and benzoguanamine-formaldehyde resin particles. Among these, cross linked polystyrene particles, cross linked polymethyl methacrylate particles, and cross linked methyl methacrylate-styrene copolymer particles are preferred. Further, surface modified particles, in which a compound including fluorine atoms, silicon atoms, carboxyl groups, hydroxyl groups, amino groups, sulfonic acid groups, phosphoric acid groups, etc. is chemically bonded to the surfaces of these resin particles, and particles having nano sized fine particles such as silica and zirconia bonded to the surfaces thereof are also examples of the light transmissive resin particles.

One type of light transmissive resin particle or two or more types of light transmissive resin particles may be employed in the present embodiment. From the viewpionts of impating antiglare property and high black contrast, the content of the light-transparent resin particles is from 0.5 mass % to 12 mass % with respect to the total solids of the hard coat layer-forming photocurable composition, preferably from 1 mass % to 10 mass %, and more preferably from 2 mass % to 8 mass %.

[Surfactant]

In order to secure surface uniformity in coating unevenness, drying unevenness, and point defects, it is preferable for the photocurable composition of the present embodiment to include a fluorine series surfactant a silicone series surfactant, or both. Particularly the fluorine series surfactant exhibits effects of improving surface defects such as coating unevenness, drying unevenness, and point defects with a smaller added amount, and therefore may be preferably employed. By providing high speed coating suitability while increasing the surface uniformity, it is possible to increase productivity.

Preferred examples of the fluorine series surfactant include a fluoroaliphatic group containing copolymer (hereinafter, sometimes abbreviated as "fluorine series polymer"). Specific examples of the fluorine series polymer are those described in paragraphs [0037] through [0045] of Japanese Unexamined Patent Publication No. 2005-115359 and in paragraphs [0063] through [0071] of Japanese Unexamined Patent Publication No. 2006-117915.

The preferred amount of the fluorine series polymer to be added as a surfactant is in a range from 0.001 parts by mass to 5 parts by mass with respect to 100 parts by mass of a coating solution, more preferably in a range from 0.005 parts by mass to 3 parts by mass, and even more preferably in a range from 0.01 parts by mass to 1 part by mass. If the amount of the added fluorine series polymer is 0.001 parts by mass or greater, the advantageous effects obtained by adding the fluorine series polymer can be sufficiently obtained. If the amount of the added fluorine series polymer is 5 parts by mass or less problems such as insufficient drying of the coated film and the performance of the coated film (such as reflectance and scratch resistance) being adversely affected will not occur.

The photocurable composition of the present embodiment is configured as described above.

In the optical film 110, the hard coat layer 112 is formed by coating the substrate 111 with the photocurable composition on the substrate 111, and then curing the photocurable composition by irradiating an obtained coated film with light. Ultraviolet light is preferred as the light to be irradiated. It is preferable for the luminance of the ultraviolet light to be within a range from 10 mW/cm$^2$ to 5000 mW/cm$^2$, and for the irradiation intensity to be within a range from 10 mJ/cm$^2$ to 10000 mJ/cm$^2$.

In addition, it is preferable to irradiate the substrate 111 coated with the photocurable composition with light at a temperature in a range from 10° C. to 90° C., and more preferably in a state in which the temperature is within a range from 30° C. to 90° C., in order to form the hard coat layer 112. It is possible to effectively advance the reaction of the epoxy monomer by irradiating the light within such a temperature range. Heating may be performed as necessary in order for the substrate 111 and the photocurable composition to be within this temperature range. The temperature of the substrate 111 at this time can be measured by PT-2LD manufactured by OPTEX or the like.

Further, the hard coat layer 112 may be formed by heating after ultraviolet light is irradiated thereon. However, it is preferable for heating to not be performed after the light is irradiated from the viewpoints of the complexity of the process and suppressing damage to the substrate or other layers, if it is possible to obtain a desired level of performance after the light is irradiated.

The film thickness of the hard coat layer 112 formed in the manner described above is not particularly limited, but is preferably 3 μm or greater and 30 μm or less, more preferably 4 μm or greater and 20 μm or less, and even more preferably 5 μm or greater and 15 μm or less. By setting the film thickness of the hard coat layer to be 3 μm or greater, it is possible to obtain sufficient hard coat properties and also possible to lower moisture permeability. By setting the film thickness of the hard coat layer to be 30 μm or less, drying is facilitated during a step of applying/drying on the substrate, and superior brittleness can be obtained The film thickness of the hard coat layer 112 can be determined by measuring the film thickness prior to and following lamination of the hard coat layer, and by calculating the difference between the two measured film thicknesses.

A representative example of the optical film 110 has been described as an aspect in which there are no other layers between the substrate 111 and the hard coat layer 112. However, other layers may be provided between the substrate 111 and the hard coat layer 112 within a range that the advantageous effects of the present disclosure can be obtained.

For example, from the viewpoint of adhesive properties between the substrate 111 and the hard coat layer 112, it is preferable for the optical film 110 to have a layer (mixture layer) that seeps into the substrate 111 before the components of the hard coat layer 112 complete curing, and is formed by curing in this soaked state, provided between the between the substrate 111 and the hard coat layer 112. By having such a layer, the adhesive properties between the substrate 111 and the hard coat layer 112 is improved. The thickness of the mixture layer is preferably 0.1 μm or greater and 3 μm or less. The presence or the absence of the mixed layer and the thickness thereof can be confirmed by observing the cross section of the polarizing plate protecting film 110 with a electron microscope. For example the presence or the absence of the mixed layer and the thickness thereof can be confirmed and measured using a scanning electron microscope S-5200 (manufactured by Hitachi, Ltd.).

The optical film 110 is an optical film comprising the hard coat layer 112 provided on the substrate 111. The optical film 110 is produced by coating the photocurable composition including an epoxide represented by Chemical Formula I above, a bisphenol compound, and a cationic photopolymerization initiator on the substrate 111 to form a coated film, and forming the hard coat layer 112 by irradiating light onto the coated film to cure the coated film, thereby forming the hard coat layer 112. The hard coat layer 112 formed by curing the photocurable composition has a high degree of hardness and a low moisture permeability. Accordingly, the optical film 110 is favorably suited for use as a polarizing plate protecting film which requires a high degree of hardness and low moisture permeability.

<Polarizing Plate Protecting Film>

A polarizing plate protecting film is the optical film 110 of the present embodiment. Therefore, the polarizing plate protecting film has a high degree of hardness and a low moisture permeability. The polarizing plate protecting film is a film member for protecting the polarizer of a polarizing plate 10 to be described later. Accordingly, in the polarizing plate 10 it is preferable for the polarizing plate protecting film to be provided such that the hard coat layer 112 is on the surface on the side toward the exterior of the polarizer.

In the case that the optical film 110 is employed as a polarizing plate protecting film, surface treatments may be administered as necessary. Alternatively, other functional layers may be provided on the side (back surface) of the substrate 111 opposite the side on which the hard coat layer 112 is formed or between the substrate 11 and the hard coat layer 112.

The functional layers in the case that the optical film 110 is employed as a polarizing plate protecting film are not particularly limited, and examples include an antireflection layer (a layer of which the refractive index has been adjusted, such as a low refractive index layer, a medium refractive index layer, and a high refractive index layer), an anti glare layer, an antistatic layer, an ultraviolet absorbing layer, and an adhesion layer (a layer for improving the adhesive properties between the substrate and the hard coat layer).

The functional layers may be a single layer, or a plurality of functional layers may be provided. The method for laminating the functional layers is not particularly limited.

An antireflection layer may be provided on the surface of the hard coat layer 112. Known antireflection layers may be favorably employed. Among known antireflection layers, UV curable type antireflection layers are preferred. The antireflection layer may be a low reflectance layer of a single layer structure with a film thickness of λ/4 or a multilayer structure. However, a low reflectance layer of a single layer structure with a film thickness of λ/4 is particularly preferable.

Examples of preferred layer structures of the polarizing plate protecting film 110 are shown below. However, the layer structure of the polarizing plate protecting film 110 is not particularly limited to these layer structures.

Substrate/hard coat layer
Substrate/hard coat layer/antireflection layer
Substrate/adhesion layer/hard coat layer
Substrate/adhesion layer/hard coat layer/antireflection layer
Substrate/ultraviolet absorbing layer/hard coat layer
Substrate/ultraviolet absorbing layer/hard coat layer/antireflection layer
Substrate/adhesion layer/ultraviolet absorbing layer/hard coat layer
Substrate/adhesion layer/ultraviolet absorbing layer/hard coat layer/antireflection layer
Substrate/hard coat layer/antiglare layer
Substrate/hard coat layer/antiglare layer/antireflection layer In addition, the polarizing plate protecting film 110 may further include an optically anisotropic layer. An optically isotropic layer in which a film having a constant phase difference is uniformly formed within the plane thereof may be employed as the optically isotropic layer, or an optically isotropic layer in which phase difference regions having slow axis with different directions and sizes of phase differences are regularly arranged within the plane thereof to form a pattern may be employed as the optically isotropic layer.

It is preferable for the optically anisotropic layer to be formed on the back surface of the substrate 111. However, the optically anisotropic layer may be formed on the same side of the substrate 111 as the hard coat layer 112.

Optically anisotropic layers in which films having a constant phase difference are uniformly formed within the plane thereof and which are favorably suited for the polarizing plate protecting film of the present embodiment are disclosed in Japanese Unexamined Patent Publication Nos. 2012-098721 and 2012-127982. Optically isotropic layers which are formed as patterns are disclosed in Japanese Patent Nos. 4825934 and 4887463, and disclosed as an aspect in which it is combined with a light orienting film disclosed in PCT Japanese Publication No. 2012-517024 (International Patent Publication No. 2010/090429) and patterned exposure.

<Optical Compensation Film>

The optical film 110 may be used for various applications in addition to the polarizing plate protecting film. For example, the optical film 110 may be favorably employed as an optical compensation film in a liquid crystal display device. Optical compensation films are optical members that compensate for phase differences and are generally used in liquid crystal display devices. An optical compensation film is the same as a phase difference plate and an optical compensation sheet. Optical compensation films have birefringence, and are employed to remove coloration of display screens of liquid crystal display devices and to improve viewing angle properties.

The optical film 110 may be used as an optical compensation film itself, or can be used as a substrate of the optical compensation film, and an optically anisotropic layer may be provided thereon as necessary. The optically anisotropic layer to be used in combination may be formed by a composition containing a liquid crystal compound, or may be formed by a thermoplastic film having birefringence.

"Polarizing Plate and Liquid Crystal Display Device"

As described previously, the optical film 110 is favorably suited for use as a polarizing plate protecting film, which requires a high degree of hardness and low moisture permeability. A polarizing plate of which at least one surface is protected by the polarizing plate protecting film comprising the optical film 110, and a liquid crystal display device that comprises such a polarizing plate as at least the polarizing plate on the viewing side are a polarizing plate and a liquid crystal display device which have superior durability and little deterioration due to moisture absorption.

The optical film 110 may be used as a protective film for either of two polarizing plates. Meanwhile, in a liquid crystal display device 1, since the surface of the viewing side is most affected by environmental changes, in the present embodiment, a configuration in which the polarizing plate 10 on the viewing side (front side) is provided with the polarizing plate protecting film 110 is adopted (refer to FIG. 2).

An aspect in which the optical film 110 is provided on the polarizing plate on the viewing side as a viewing side protective film, and the optical film 110 is provided on the polarizing plate on the side of a backlight as a backlight side protective film suppresses expansion and contraction of polarizers included in the two polarizing plates and is favorable in the point that warping of panels ca be prevented. However, it is preferable for the optical film 110 to be employed at least on the polarizing plate on the viewing side between the two polarizing plates as a viewing side protective film.

FIG. 3 is a schematic diagram that illustrates the structure of a liquid crystal display device 1 according to an embodiment according to the present disclosure. As illustrated in FIG. 3, the liquid crystal display device 1 comprises a pair of polarizing plates (an upper polarizing plate 10 and a lower polarizing plate 18) and liquid crystal cells 2 clamped between the polarizing plates. The liquid crystal cells 2 comprise a liquid crystal layer 15, and an upper liquid crystal circuit board 13 with electrodes and a lower liquid crystal circuit board 16 with electrodes provided above and below the liquid crystal layer 15.

The upper and lower circuit boards with electrodes 13 and 16 are generally those in which a transparent conductive film is formed on a circuit board. The upper and lower circuit boards with electrodes 13 and 16 are provided such that voltage is applied to the liquid crystal layer 15 via the circuit boards. In the present embodiment, an aspect in which the liquid crystal layer 15 is clamped between the upper and lower circuit boards with electrodes 13 and 16 constituted by transparent electroconductive films formed on circuit boards is illustrated as an example. However, a gas barrier layer, a hard coat layer, an undercoat layer that increases the adhesive properties between the circuit boards and the transparent conductive films, and the like may be provided. The circuit boards that clamp the liquid crystal layer 15 generally have thicknesses of 50 µm to 2 mm.

Also, in the case that the liquid crystal display device 1 is of the transmission type, the aspect will be that in which the upper polarizing plate 10 is designated as a front side (viewing side) polarization plate, the lower polarizing plate 18 is designated as a rear side (backlight side) polarization plate, and although not shown, a back light unit is provided under the rear side polarizing plate 18, and a color filter is provided between the liquid crystal layer 15 and the front side polarizing plate 10. In FIG. 3, reference numerals 12 and 19 respectively denote the directions of absorption axes which are substantially perpendicular to each other, and reference numerals 14 and 17 denote orientation control directions of the electrode circuit boards.

In the present embodiment, aspects in which the optical film 110 is employed as a protective film for the viewing side polarizing plate 10 between the two polarizing plates 10 and 18. However, the present disclosure is not intended to be limited to such an aspect.

FIG. 2 is a cross sectional view in the thickness direction showing the configuration of a polarizing plate 10 with a polarizing plate protecting film (optical film) 110 of the present embodiment on the surface thereof. As illustrated in FIG. 2, the polarizing plate 10 is provided with the polarizing plate protecting film 110 made of an optical film 110 on the top surface of a polarizer 100. FIG. 2 illustrates a configuration in which the upper surface of the polarizer 100 is arranged closer to the exterior.

Further, in the present embodiment, the polarizing plate protecting film 120 on the side of the liquid crystal cell is provided with an optically anisotropic layer 130 on the side of the liquid crystal cells. The lower polarizing plate 18 is of a configuration in which the stacking direction of each layer is opposite that of the upper polarizing plate 10.

The method for producing the polarizing plate 10 is not particularly limited, and the polarizing plate 10 may be produced by a common method. There is a method in which an obtained polarizing plate protecting film undergoes alkali treatment, and adhered to both sides of the polarizer, which is produced by stretching and immersing a polyvinyl alcohol film in a was prepared by immersing stretched in an iodine solution, using a completely saponified polyvinyl alcohol solution. Instead of the alkali treatment, a simplified adhesion processing may be performed as described in Japanese Unexamined Patent Publication Nos. 6(1994)-094915 and 6(1994)-118232. The adhesion surface of the polarizing plate protecting film 110 and the polarizer 100 may be the surface on which the hard coat layer 112 is laminated, or may be the surface on the opposite side thereto.

Examples of the adhesive used to bond the polarizer and the polarization plate protective film treated surface include polyvinyl alcohol, and polyvinyl alcohol-based adhesive such as polyvinyl butyral, and vinyl-based latexes such as butyl acrylate, for example. The polarizing plate protecting films 110 and 120 and the polarizer 100 may also be bonded with other adhesives or pressure sensitive adhesives, or may be laminated directly without an adhesive or a pressure-sensitive adhesive.

The polarizing plate protecting film is the optical film 110 of the present disclosure having a high degree of hardness and a low moisture permeability. In the liquid crystal display device 1, the front side (viewing side) polarization plate 10 is provided with the polarizing plate protecting film 110 on the surface toward the viewing side. Therefore, according to the present embodiment, it is possible to provide the polarizing plate 10 and the liquid crystal display device 1 that deteriorates less due to moisture absorption.

"Design Modifications"

A transmission type liquid crystal display device was described as an example in the above embodiment. However, the liquid crystal display device is not limited to that of the transmissive type. The present disclosure is also effective for liquid crystal display devices of the reflective type and or the semi transmissive type.

An embodiment of the liquid crystal display device has been described. The display mode of liquid crystal cells to which the present disclosure may be applied is not particularly limited. Display modes in which the present disclosure is valid presently include various display modes, such as TN (Twisted Nematic), IPS (In Plane Switching), FLC (Ferroelectric Liquid Crystal), AFLC (Anti-Ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic). In addition, the present disclosure is also valid for display modes in which the above display modes are divided into multiple domains.

EXAMPLES

Examples will be described below in it is described by the following examples, order to explain the present disclosure in detail. However, the present disclosure is not limited to these Examples.

Example 1

First, components of the following composition were mixed, and a photocurable composition for forming a hard coat layer was prepared by filtration through a polypropylene filter having a pore size of 5 μm.

[Composition of the Photocurable Composition for Forming a Hard Coat Layer]

| | |
|---|---|
| Compound 1a (manufactured by Daicel Corporation CEL2021P) | 33.4 parts by mass |
| Irgacure290 (manufactured by BASF) | 2.6 parts by mass |
| Fluoroaliphatic group containing copolymer (a) (Solid concentration 1 wt % MEK diluted solution) | 1.0 part by mass |
| Compound 2a (manufactured by Tokyo Kasei Kogyo Co., Ltd.) | 15.4 parts by mass |
| MEK (methyl ethyl ketone) | 14.6 parts by mass |
| MiBK (methyl isobutyl ketone) | 34.0 parts by mass |

Fluoroaliphatic Group Containing Copolymer (a)

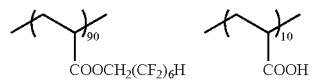

Fujitac TG40 is (manufactured by FUJIFILM Corporation, width 1340 mm, thickness 40 μm) was unwound from a roll as a substrate, the hard coat layer forming photocurable composition above was coated onto the substrate using the die coating method using a slot die as described in Example 1 of Japanese Unexamined Patent Publication No. 2006-122889 at a conveying speed of 30 m/min. The substrate was dried for 150 seconds at 60° C. by adjusting the temperature in the coating device. The temperature was measured by PT-2LD manufactured by OPTEX, Inc. Then, a coated layer was cured by irradiating ultraviolet light with a 160 W/cm air cooled metal halide lamp (manufactured by Eye Graphics Co.) at a luminance of 400 mW/cm$^2$ and an irradiation intensity of 300 mJ/cm$^2$ in a nitrogen purged atmosphere having an oxygen concentration of about 0.1% by volume with the temperature of the substrate at 25° C., to cure the coated layer. After the coated layer was cured, the substrate was wound, to obtain a polarizing plate protecting film having a hard coat layer on the substrate (Example 1). The coating amount was adjusted such that the thickness of the hard coat was 10 μm.

Examples 2-19, Comparative Examples 1-5

The poly-carboxylic acid resin (as poly-carboxylic acid resin 1) described as Synthesis Example 1 of Japanese Unexamined Patent Publication No. 2007-297604 was synthesized.

Next, photocurable compositions for forming hard coats, in which the epoxy monomer and the types and the amounts of additives were varied as shown in Table 1, were prepared. Each of the photocurable compositions for forming hard coats was employed in the same manner as Example 1 to obtain polarizing plate protecting films (Examples 2 to 19) and comparative polarizing plate protecting films (Comparative Examples 1-5). The coating amounts were adjusted such that the thicknesses of the hard coats were those shown in Table 1. The chemicals used in the Examples and the Comparative Examples are shown in Table 2.

The contents of the polymerizable compounds shown in Table 1 are the ratios (mass %) with respect to the total solid content in the photocurable compositions for forming hard coats.

(Evaluation of Polarizing Plate Protecting Film)

The film thickness of the polarizing plate protecting film of each of the produced Examples and Comparative Examples was measured. Measurements and evaluations of moisture permeability and pencil hardness were conducted. The measurement methods and conditions are described later in (1) to (3) below. The evaluation results for each of the examples are shown in Table 1.

As shown in Table 1, Examples 1 through 19 achieved the moisture permeabilities of 200 g/m$^2$/day or less. Examples 2 through 6 show changes in the moisture permeability and pencil hardness different concentrations of the same bisphenol compounds 2b are added. Examples 2 through 6 indicate that the higher the concentration of the bisphenol compounds in the photocurable composition, the moisture permeability decreases, but that the hardness of H does not change when the concentration of the bisphenol compound is from 5% by mass to 30% by mass. The results indicate that even when the concentration of the bisphenol compound is 40 wt %, a hardness of F, at which no problems occur for use as polarizing plate protecting film, is obtained.

In addition, Examples 5 and 7 through 16 are polarizing plate protecting films obtained using types of bisphenol compounds different from that of the first embodiment at the same concentration in photocurable compositions. Accordingly, a comparison of Example 1 with Examples 5 and 7 to 16 enables the effect the bisphenol compounds on the moisture permeability or the pencil hardness to be confirmed.

Example 5 employs bisphenol Compound 2b, which is the bisphenol Compound 2a of Example 1 in which a methyl group is introduced into each hydroxyphenyl group. Example 7 employs bisphenol Compound 2c, which is the bisphenol Compound 2a of Example 1 in which two methyl groups are introduced into each hydroxyphenyl group. In Examples 5 and 7, the moisture permeability is reduced compared to Example 1. These results indicate that the moisture permeability decreases by introducing methyl groups into in bisphenol compounds.

Examples 8 and 9 are examples in which bulky groups are introduced into the hydroxyphenyl groups of bisphenol compounds compared to Example 5. The results indicate that the introduction of such groups has less effects of reducing the moisture permeability compared to the methyl group.

Example 10 is an example in which cyclohexane type skeletons are introduced at portions where the hydroxyphenyl groups bond to each other. The results indicate that the introduction of such groups has a high effect of reducing the moisture permeability. In addition, Example 11 is an example in which methyl groups are introduced into the hydroxyphenyl groups of bisphenol Compound 3a of Example 10. A comparison of Example 10 and Example 11 also indicate that the introduction of such groups increases the effect of lowering the moisture permeability.

Meanwhile, Example 12 is an example that uses Compound 4 obtained by substituting the methyl groups for the cyclohexyl groups in Example 10. An effect of reducing the moisture permeability by the introduction of a methyl group to the cyclohexyl group was not observed.

Examples 13 through 16 are examples in which bulky skeletons having phenyl groups are introduced at portions where hydroxyl groups bond with each other instead of the cyclohexane type skeletons. It was confirmed that the introduction of such groups yielded less of an effect of lowering the moisture permeability compared to cyclohexyl groups.

Examples 17, 18, and 19 are examples in which the film thickness of Example 4 was varied, and changes in moisture permeability and hardness were investigated. From these results, it was confirmed that the thicker the film thickness, the lower the moisture permeability and the higher the degree of hardness.

Comparative Example 1 is an example in which a polarizing plate protecting film was produced in the same manner as Example 1, except that a bisphenol compound was not added. Comparative Example 2 is an example in which a polarizing plate protecting film was produced in the same manner as Example 1, except that the epoxide below (Compound 1b) was employed instead of the epoxide of Compound 1a. Further, Comparative Examples 3 through 5 are examples in which additives other than bisphenol compounds were added to Compound 1. From these examples, it was confirmed that the combination of an epoxide and bisphenol compound of Compound 1a achieves sufficient low moisture permeability at a film thickness of 10 μm.

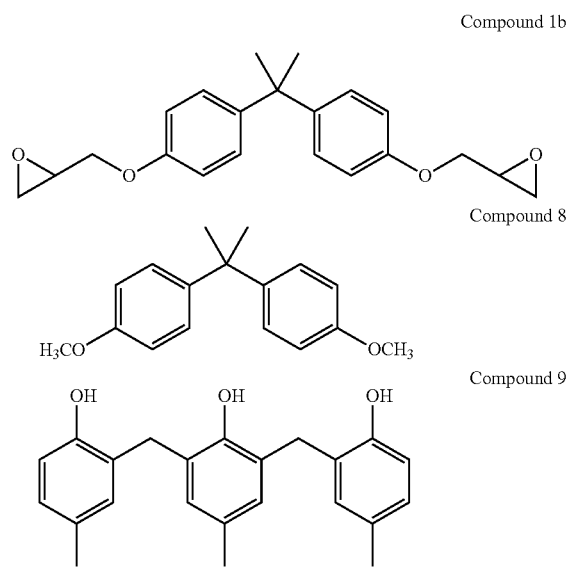

Compound 1b

Compound 8

Compound 9

(1) Thickness

The film thickness of the hard coat layers were determined by measuring the film thickness prior to and following lamination of the hard coat layer, and by calculating the difference between the two measured film thicknesses. The thicknesses of the mixed layers were determined by observation of cross sections of the polarizing plate protecting films in the film thickness direction in scanning electron micrographs (cross-sectional SEM image, captured by Hitachi scanning electron microscope S-5200).

(2) Moisture Permeability (Moisture Permeability at 40° C. And 90% Relative Humidity)

70 mm samples of the polarization plate protective films of the Examples and Comparative Examples were humidity conditioned for 24 hours at 40° C. and a relative humidity of 90%, then moisture permeability was measured by the method described in JIS Z 0208.

The moisture permeabilities of the polarizing plate protecting films and the cellulose ester substrates were measured, and the moisture permeability of the hard coat layers were measured calculations using the moisture permeabilities of the polarizing plate protecting films and the cellulose ester substrates according to Formula (1) below.

From a gas transmission formula of composite films (for example, T. Nakagawa, "The Science of Barrier Properties of Packaging Materials", The Society of Packaging Science & Technology, Japan, Packaging Fundamental Course 5, pp. 68-72, 2003), if the moisture permeability of the polarizing plate protecting film in the normal state is designated as $J_f$, the moisture permeability of the cellulose ester base is designated as $J_s$, the moisture permeability of the hard coat layer when a polarizing plate protecting film is separated into a cellulose ester substrate and the hard coat layer is designated as $J_b$, the following equation is established.

$$1/J_f = 1/J_s + 1/J_b \quad (1)$$

The moisture permeability $J_f$ of the polarizing plate protecting films and the moisture permeability $J_s$ of the cellulose ester substrates can be measured directly, and the moisture permeability $J_b$ of the hard coat layers can be determined by performing calculations based on these measurements.

(3) Pencil Hardness Evaluation

Pencil hardness evaluations as described in JIS K 5600 were performed to obtain indices of scratch resistance. The polarizing plate protecting films were humidity conditioned for 2 hours at 25° C. and a relative humidity of 60%, then test pencils having hardnesses from 2B to 3H as defined by JIS S 6006 were employed under a load of 4.9N, and evaluations were conducted according to the criteria below, with K being the highest evaluation value for hardness.

OK: 4 or more without scratches when evaluated with n=5

NG: 3 or fewer without scratches when evaluated with n=5

(Evaluation of Liquid Crystal Display Devices)

(1) Production of Liquid Crystal Display Devices

Liquid crystal display devices were produced employing each of the polarizing plate protecting films produced in the manner described above, and evaluations were conducted.

<Production of Polarizing Plates>

1) Saponification of Films

Commercially available cellulose acylate films (FUJITAC ZRD40, manufactured by FUJIFILM Corporation), commercially available cellulose acylate films TD60 (manufactured by FUJIFILM Corporation), polarizing plate protecting film samples of Examples 1 through 19 and Comparative Examples 1 through 5 produced in the manners described above were immersed for 2 minutes in a 1.5 mol/L NaOH aqueous solution (saponification solution) which was maintained at 55° C. The films were washed with water, then immersed for 30 seconds in a 0.05 mol/L sulfuric acid aqueous solution at 25° C. Further, the films were passed under running water for 30 seconds such that they were in a neutral state. Then, draining using an air knife was repeated 3 times to remove the water. Thereafter, the films were placed in a drying zone at 70° C. for 15 seconds, to produce films that underwent a saponification process.

2) Production of Polarizers

Polarizers having film thicknesses of 20 μm were produced by adsorbing iodine on stretched polyvinyl alcohol films according to Example 1 of Japanese Unexamined Patent Publication No. 2001-141926.

3) Bonding
(Front Side Polarization Plates: Production of Polarizing Plates of Examples 1 Through 19, and Polarizing Plates of Comparative Examples 1 Through 5)

Following the above saponification, the polarizing plate protecting films of Examples 1 through 19 and the polarizing plate protecting films of Comparative Examples 1 through 5 (the surfaces on which the hard coat layers of the polarizing plate protecting films are not laminated are arranged to contact the polarizers), the polarizers prepared in the above manner, and the saponified cellulose acylate films ZRD40 were adhered in this order with a PVA-based adhesive, then thermally dried to produce polarizing plates of Examples 1 through 19 and polarizing plates of Comparative Examples 1 through 5.

Here, in each example, the polarizers and the polarizing plate protecting films were arranged such that the longitudinal direction of a roll of the polarizer was parallel to the longitudinal direction of a roll of the polarizing plate protecting film. In addition, the polarizers and the polarizing plate protecting films were arranged such that the longitudinal direction of the roll of the polarizer was parallel to the longitudinal direction of a roll of the cellulose acylate film ZRD40.

(Production of Rear Side Polarizing Plates)

Cellulose acylate films TD 60 that underwent the above saponification process, stretched iodine PVA polarizers, and cellulose acylate films ZRD40 that underwent the above saponification process were adhered in this order with a PVA based adhesive then were thermally dried, to obtain rear side polarizing plates.

At this time, rolls of the produced polarizer and rolls of the cellulose acylate film TD60 were arranged such that the longitudinal directions thereof were parallel. In addition, rolls of the produced polarizer and rolls of the cellulose acylate film ZRD40 were arranged such that the longitudinal directions thereof were parallel.

<Implementation to IPS Panels>

The upper and lower polarizing plates of IPS mode liquid crystal cells (42LS5600 manufactured by LGD) were removed, and the polarizing plates of Examples 1 through 19 and the polarizing plates of Comparative Examples 1 through 5 were adhesively attached to the front sides thereof such that the cellulose acylate films ZRD40 were arranged toward the liquid crystal cells as front side polarizing plates. The rear polarizing plates produced in the manner described above were adhesively attached to the rear sides of the IPS mode liquid crystal cells such that the cellulose acylate films ZRD40 were arranged toward the liquid crystal cells as rear side polarizing plates. The polarizing plates were arranged in a cross Nicol arrangement such that the absorption axis of the front side polarizing plates was the longitudinal direction (the horizontal direction) and the transmission axis of the rear side polarizing plates was the longitudinal direction (horizontal direction). The thickness of the glass used in the liquid crystal cells was 0.5 mm.

The obtained liquid crystal display devices were designated as liquid crystal display devices of Examples 1 through 19 (Examples 1 through 19) and liquid crystal display devices of Comparative Examples 1 through 5 (Comparative Examples 1 through 5).

(2) Evaluation of Light Leakage

The light leakage of the liquid crystal display devices described in the manner described above was evaluated. The results are shown in Table 1 below.

The liquid crystal display devices of Examples 1 through 19 and the liquid crystal display device of Comparative Examples 1 through 5 underwent thermo for 96 hours at 60° C. and 90% relative humidity, then left to stand for two hours at 25° C. and 60% relative humidity. Then, the backlights of the liquid crystal display devices were lit, and light leakage at four corners of each panel was evaluated at 5 hours and 10 hours after the backlights were lit.

Evaluations of light leakage evaluation were performed by photographing black display screens from the fronts of the screens with a luminance measuring camera "ProMetric" (Radiant Imaging, Inc.). A five tiered evaluation was conducted based on the brightness difference between the average brightness of the entire screen and locations at the four corners where the amount of light leakage was great. In the present disclosure, levels A and B are within an allowable range, while levels C through E are outside the allowable range.

A: light leakage was not visually confirmed at the 4 corners of the panel after 5 hours, and light leakage was not visually confirmed at the 4 corners of the panel after 10 hours B: slight light leakage was visually confirmed at 1 or 2 corners of the panel after 5 hours, and light leakage was not visually confirmed at the 4 corners of the panel after 10 hours C: slight light leakage was visually confirmed at 1 or 2 corners of the panel after 5 hours, and slight light leakage was visually confirmed at 1 or 2 corners of the panel after 10 hours D: slight light leakage was visually confirmed at 3 or 4 corners of the panel after 5 hours, and slight light leakage was visually confirmed at 1 or 2 corners of the panel after 10 hours E: slight light leakage was visually confirmed at 3 or 4 corners of the panel after 5 hours, and slight light leakage was visually confirmed at 3 or 4 corners of the panel after 10 hours

TABLE 1

|  | Substrate | Epoxy Monomer | | Additive | | Hard Coat Layer | Moisture | | |
|---|---|---|---|---|---|---|---|---|---|
|  |  | Compound Number | (%) | Compound Number | (%) | Thickness [μm] | Permeability [g/m²/day] | Pencil Hardness | Light Leakage |
| Example 1 | TG40 | Compound 1a | 65 | Compound 2a | 30 | 10 | 138 | H | B |
| Example 2 | TG40 | Compound 1a | 90 | Compound 2b | 5 | 10 | 186 | H | B |
| Example 3 | TG40 | Compound 1a | 85 | Compound 2b | 10 | 10 | 162 | H | B |
| Example 4 | TG40 | Compound 1a | 75 | Compound 2b | 20 | 10 | 122 | H | B |
| Example 5 | TG40 | Compound 1a | 65 | Compound 2b | 30 | 10 | 67 | H | A |
| Example 6 | TG40 | Compound 1a | 55 | Compound 2b | 40 | 10 | 55 | F | A |
| Example 7 | TG40 | Compound 1a | 65 | Compound 2c | 30 | 10 | 97 | H | A |
| Example 8 | TG40 | Compound 1a | 65 | Compound 2d | 30 | 10 | 88 | H | A |
| Example 9 | TG40 | Compound 1a | 65 | Compound 2e | 30 | 10 | 92 | H | A |

TABLE 1-continued

| | Substrate | Epoxy Monomer Compound Number | (%) | Additive Compound Number | (%) | Hard Coat Layer Thickness [μm] | Moisture Permeability [g/m²/day] | Pencil Hardness | Light Leakage |
|---|---|---|---|---|---|---|---|---|---|
| Example 10 | TG40 | Compound 1a | 65 | Compound 3a | 30 | 10 | 86 | H | A |
| Example 11 | TG40 | Compound 1a | 65 | Compound 3b | 30 | 10 | 69 | H | A |
| Example 12 | TG40 | Compound 1a | 65 | Compound 4 | 30 | 10 | 109 | H | B |
| Example 13 | TG40 | Compound 1a | 65 | Compound 5 | 30 | 10 | 85 | H | A |
| Example 14 | TG40 | Compound 1a | 65 | Compound 6 | 30 | 10 | 106 | H | B |
| Example 15 | TG40 | Compound 1a | 65 | Compound 7a | 30 | 10 | 182 | H | B |
| Example 16 | TG40 | Compound 1a | 65 | Compound 7b | 30 | 10 | 131 | H | B |
| Example 17 | TG40 | Compound 1a | 75 | Compound 2b | 20 | 6 | 194 | F | B |
| Example 18 | TG40 | Compound 1a | 75 | Compound 2b | 20 | 8 | 158 | H | B |
| Example 19 | TG40 | Compound 1a | 75 | Compound 2b | 20 | 15 | 79 | 2H | A |
| Comparative Example 1 | TG40 | Compound 1a | 95 | none | | 10 | 242 | H | D |
| Comparative Example 2 | TG40 | Compound 1b | 65 | Compound 2b | 30 | 10 | 255 | B | E |
| Comparative Example 3 | TG40 | Compound 1a | 65 | Compound 8 | 30 | 10 | 230 | F | D |
| Comparative Example 4 | TG40 | Compound 1a | 75 | polycarboxylic acid resin 1 | 20 | 10 | 240 | B | C |
| Comparative Example 5 | TG40 | Compound 1a | 75 | Compound 9 | 20 | 10 | 252 | F | E |

TABLE 2

| | Manufacturer | Product Name |
|---|---|---|
| Compound 1a | DAICEL Corp. | CEL2021P |
| Compound 1b | Mitsui Chemical Corp. | jER828US |
| Compound 2a | Tokyo Chemical Industry Co. | 2,2-bis (4-hydroxyphenyl) propane |
| Compound 2b | Tokyo Chemical Industry Co. | 2,2-bis (4-hydroxy-3-methyl phenyl) propane |
| Compound 2c | Tokyo Chemical Industry Co. | 2,2-bis (4-hydroxy-3,5-dimethyl-phenyl) propane |
| Compound 2d | Tokyo Chemical Industry Co. | 2,2-bis (4-hydroxy-3-isopropyl-phenyl) propane |
| Compound 2e | Tokyo Chemical Industry Co. | 2,2-bis (3-cyclohexyl-4-hydroxyphenyl) propane |
| Compound 3a | Tokyo Chemical Industry Co. | 1,1-bis (4-hydroxyphenyl) cyclohexane |
| Compound 3b | Tokyo Chemical Industry Co. | 1,1-bis (4-hydroxy-3-methylphenyl) cyclohexane |
| Compound 4 | Honshu Chemical Industry Co. | bisP-TMC |
| Compound 5 | Tokyo Chemical Industry Co. | 4,4'-(α-methyl benzylidene) bisphenol |
| Compound 6 | Tokyo Chemical Industry Co. | 4,4'-dihydroxy tetraphenylmethane |
| Compound 7a | Tokyo Chemical Industry Co. | 9,9-bis (4-hydroxyphenyl) fluorene |
| Compound 7b | Tokyo Chemical Industry Co. | 9,9-bis (4-hydroxy-3-methyl phenyl) fluorene |
| Compound 8 | Kanto Chemical Co. | bisphenol A dimethyl ether |
| Compound 9 | Tokyo Chemical Industry Co. | 2,6-bis [(2-hydroxy-5-methylphenyl) methyl]-4-methylphenol |

As shown in Table 1, Examples 1 to 19 have high degrees of hardness is high and low moisture permeability. The amounts of light leakage in the liquid crystal display devices manufactured using the polarizing plate protecting films of Examples 1 to 19 were small.

INDUSTRIAL APPLICABILITY

The present disclosure may be utilized in image display devices such as a liquid crystal display (LCD), a plasma display panel (PDP), an electroluminescence display (ELD), and a cathode ray tube (CRT) display.

What is claimed is:
1. An optical film comprising:
a substrate; and
a hard coat layer provided on the substrate;
the hard coat layer being a layer obtained by curing a photocurable composition on the substrate;
the photocurable composition including an epoxide represented by Chemical Formula I below, a bisphenol compound represented by General Formula II-1 below, and a cationic photopolymerization initiator:

[Chemical Formula I]

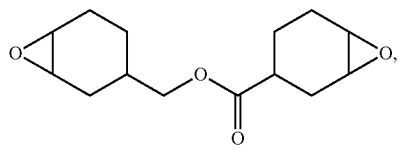

and

[General Formula II-1]

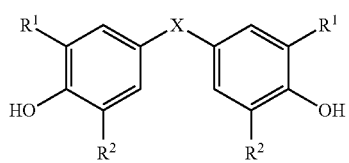

wherein $R^1$ is hydrogen and $R^2$ is a methyl group, and X represents a divalent linking group formed by at least one species selected from among a single bond, a hydrocarbon group having a carbon number within a range from 1 to 15, an oxygen atom, a sulfur atom, and a sulfonyl group.

2. An optical film as defined in claim 1, wherein the bisphenol compound is represented by General Formula 11-2 below;

[General Formula II-2]

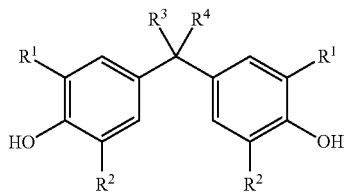

wherein $R^3$ and $R^4$ each represent hydrogen or a hydrocarbon group having a carbon number within a range from 1 to 15, and $R^3$ and $R^4$ may bind to form a single cyclic structure.

3. An optical film as defined in claim 1, wherein:
the content of the bisphenol compound with respect to the total solid content of the photocurable composition is within a range from 1% by mass to 40% by mass.

4. An optical film as defined in claim 1, wherein:
the substrate is a cellulose ester substrate.

5. An optical film as defined in claim 1, wherein:
the optical film is employed as a polarizing plate protecting film.

6. A polarizing plate, comprising:
a polarizer; and
the optical film as defined in claim 5 provided on at least one surface of the polarizer.

7. A liquid crystal display device comprising:
a pair of polarizing plates; and
a liquid crystal cell clamped between the pair of polarizing plates;
at least one of the pair of polarizing plates being the polarizing plate defined in claim 6.

8. A method for producing an optical film comprising a substrate and a hard coat layer provided on the substrate, comprising:
coating a photocurable composition including an epoxide represented by Chemical Formula I below, a bisphenol compound represented by General Formula II-1 below, and a cationic photopolymerization initiator on the substrate to form a coated film; and
forming the hard coat layer by irradiating light onto the coated film to cure the coated film:

[Chemical Formula I]

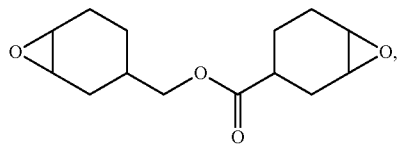

and

[General Formula II-1]

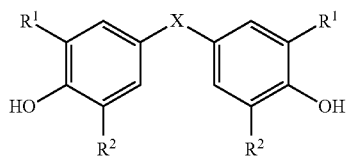

wherein $R^1$ is hydrogen and $R^2$ is a methyl group, and X represents a divalent linking group formed by at least one species selected from among a single bond, a hydrocarbon group having a carbon number within a range from 1 to 15, an oxygen atom, a sulfur atom, and a sulfonyl group.

9. A method for producing an optical film as defined in claim 8, wherein the bisphenol compound is represented by General Formula II-2 below;

[General Formula II-2]

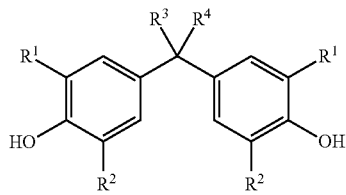

wherein $R^3$ and $R^4$ each represent hydrogen or a hydrocarbon group having a carbon number within a range from 1 to 15, and $R^3$ and $R^4$ may bind to form a single cyclic structure.

10. A method for producing an optical film as defined in claim 8, wherein:
the light which is irradiated onto the coated film is ultraviolet light.

11. A method for producing an optical film as defined in claim 8, wherein:
the irradiation of light is performed in a state in which the substrate having the coated formed thereon is heated.

12. A method for producing an optical film as defined in claim 8, wherein:
the hard coat layer is produced without applying heat after the light is irradiated.

* * * * *